(12) United States Patent
Langsdorf et al.

(10) Patent No.: US 7,743,628 B2
(45) Date of Patent: Jun. 29, 2010

(54) METHOD AND DEVICE FOR NON-CONTACT MOULDING OF FUSED GLASS GOBS

(75) Inventors: Andreas Langsdorf, Ingelheim (DE); Norbert Greulich-Hickmann, Mainz (DE); Jörg Adler, Meissen (DE); Michael Piwonski, Stuttgart (DE)

(73) Assignee: Fraunhofer-Gesellschaft zur Förderung der Angewandten Forschung e.V., München (DE)

( * ) Notice: Subject to any disclaimer, the term of this patent is extended or adjusted under 35 U.S.C. 154(b) by 1003 days.

(21) Appl. No.: 10/491,351

(22) PCT Filed: Oct. 2, 2002

(86) PCT No.: PCT/EP02/11080

§ 371 (c)(1),
(2), (4) Date: Dec. 8, 2004

(87) PCT Pub. No.: WO03/031358

PCT Pub. Date: Apr. 17, 2003

(65) Prior Publication Data

US 2005/0092024 A1 May 5, 2005

(30) Foreign Application Priority Data

Oct. 6, 2001 (DE) .................. 101 49 400

(51) Int. Cl.
*C03B 35/00* (2006.01)
*C03B 40/04* (2006.01)

(52) U.S. Cl. .................. 65/25.1; 65/182.2; 65/303; 65/355; 65/356

(58) Field of Classification Search .............. 65/25.1, 65/182.1, 182.2, 303, 304, 355, 356
See application file for complete search history.

(56) References Cited

U.S. PATENT DOCUMENTS

| 2,210,583 | A | * | 8/1940 | Henry | ............ | 65/162 |
| 3,387,333 | A | * | 6/1968 | Irvine et al. | ............ | 425/404 |
| 3,979,196 | A | | 9/1976 | Frank et al. | ............ | 65/25 R |

(Continued)

FOREIGN PATENT DOCUMENTS

DE 24 58 787 6/1976

(Continued)

OTHER PUBLICATIONS

Ameritherm, "Induction Heating Fundamentals" printed from http://www.ameritherm.com/aboutinduction.php on Apr. 17, 2008.*

(Continued)

*Primary Examiner*—Jason L. Lazorcik
(74) *Attorney, Agent, or Firm*—Baker & Daniels LLP

(57) ABSTRACT

The invention relates to a method and device for non-contact molding of fused glass or glass ceramic gobs by means of gas levitation, comprising the following method steps: a pre-form is generated, the pre-form is brought close to a molding tool, which may be connected to a compressed gas source on the open-pored region thereof facing the pre-form in order to generate a gas cushion between the molding tool and the pre-form and the molding tool is directly heated at least during a part of the molding phase.

11 Claims, 2 Drawing Sheets

U.S. PATENT DOCUMENTS

| | | | | |
|---|---|---|---|---|
| 4,546,811 | A * | 10/1985 | Potard | 164/66.1 |
| 5,079,931 | A * | 1/1992 | Lehto et al. | 65/288 |
| 5,117,482 | A * | 5/1992 | Hauber | 392/492 |
| 5,346,526 | A * | 9/1994 | Flaugher et al. | 65/273 |
| 5,383,947 | A * | 1/1995 | Montonen | 65/25.4 |
| 5,755,845 | A * | 5/1998 | Woodward et al. | 65/102 |
| 5,762,673 | A * | 6/1998 | Hirota et al. | 65/25.1 |
| 5,873,921 | A * | 2/1999 | Hirota et al. | 65/25.1 |
| 5,989,008 | A * | 11/1999 | Wytkin | 425/432 |
| 6,018,141 | A * | 1/2000 | Miller et al. | 219/221 |
| 6,799,437 | B2 * | 10/2004 | Greulich-Hickmann et al. | 65/25.1 |
| 6,829,909 | B2 * | 12/2004 | Langsdorf et al. | 65/25.1 |
| 6,886,815 | B2 * | 5/2005 | Parayre et al. | 261/96 |
| 6,907,755 | B2 * | 6/2005 | Langsdorf et al. | 65/182.2 |
| 7,222,710 | B2 * | 5/2007 | Hosoe et al. | 193/32 |
| 7,377,130 | B2 * | 5/2008 | Langsdorf et al. | 65/25.1 |
| 2002/0029589 | A1 | 3/2002 | Langsdorf et al. | 65/25.1 |
| 2005/0016215 | A1 * | 1/2005 | Greulich-Hickmann et al. | 65/182.2 |
| 2005/0092024 | A1 * | 5/2005 | Langsdorf et al. | 65/25.1 |

FOREIGN PATENT DOCUMENTS

| | | |
|---|---|---|
| DE | 39 23 587 | 1/1991 |
| DE | 100 45 373 | 4/2002 |
| EP | 0 070 760 | 1/1983 |
| JP | 61014146 | 1/1986 |
| JP | 02069327 | 3/1990 |
| JP | 04173313 | 6/1992 |
| JP | 04367526 | 12/1992 |
| JP | 08012353 | 1/1996 |
| JP | 08259242 | 10/1996 |
| JP | 09132417 | 5/1997 |
| JP | 09235124 | 9/1997 |
| JP | 2000001321 | 1/2000 |
| JP | 2000319023 | 11/2000 |

OTHER PUBLICATIONS

Bainel, P. et al., "Gas Film Levitation: A Unique Containerless Technique for the Preparation of Fluoride Glass Rods", Journal of Non-Crystalline Solds, Aug. 1993.

* cited by examiner

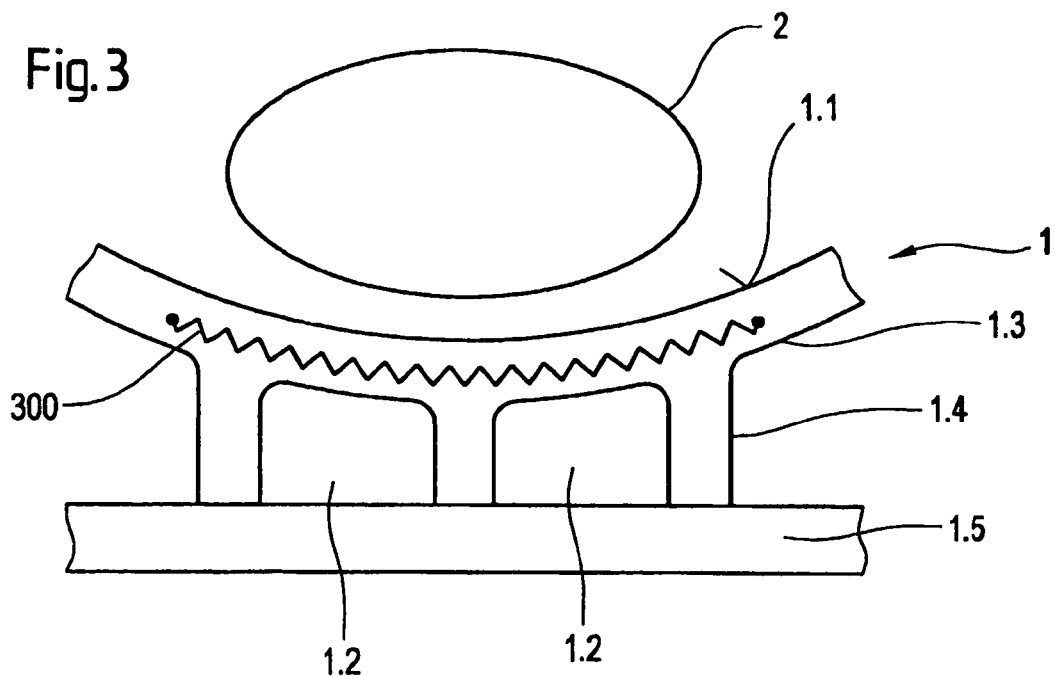
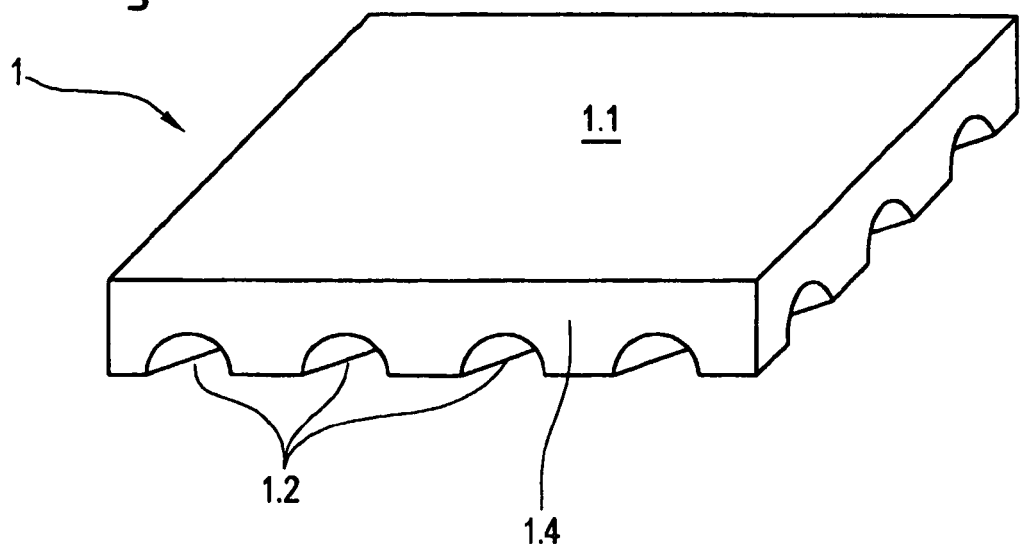

METHOD AND DEVICE FOR NON-CONTACT MOULDING OF FUSED GLASS GOBS

BACKGROUND OF THE INVENTION

The invention relates to a method and apparatus for producing objects of glass by using the so-called levitating method. A preform made of glass or glass ceramics is shaped by means of a shaping tool which is arranged as a porous membrane and comprises a gas connection. A gas cushion is built up by means of the gas connection between the surface of the levitation mold facing the preform and the preform per se. This avoids any direct contact between the preform and the levitation mold. This leads to numerous advantages. The gluing of the glass on the mold surface of the levitation mold is thus prevented, among other things.

EP 070 760 A shows and describes a method as well as an apparatus for producing a formed body made of glass. A gob of the hot melt is transferred to the mold The mold is arranged as a levitation mold The walls of the mold are thus porous. A pressure gas is connected to the levitation mold which emerges from the porous of the levitation mold below the preform and thus prevents any contact between the same and the shaping surface.

In the case of such a contactless shaping of gobs of molten glass by means of gas levitation the most homogeneous temperature in the glass is an important prerequisite for a perfect quality of the finished product. This is the case in particular when high-quality glasses are produced, e.g. for optical applications.

This goal is frequently not achieved The temperature distribution in the glass is in no way always homogeneous. This often caused by the fact that the levitation mold absorbs a part of the heat contained in the gob (especially by radiation) and that this heat absorption occurs in an uncontrolled fashion. The differences can occur from gob to gob, influenced by the different masses of these gobs. Differences in heat absorption can also occur within the gob due to the fact that the levitation mold is thicker at some places and thinner at others, which is the result of the shape of the levitation mold which is required for the shaping.

SUMMARY OF THE INVENTION

The invention is based on the object of providing a method and an apparatus with which the most even temperature distribution can be achieved within the gob of glass when applying the levitation method.

This object is achieved by the features of the independent claims. The essential idea of the invention is thus directly heating the levitation mold, and not indirectly.

The inventors have recognized the following: An indirect heating produced by an electric coiled heating filament for example cannot principally solve the problem because the porous mold is generally a relatively good heat insulator and because a coiled heating filament or the like which is attached on the outside can therefore only heat the outside of the mold. The inside of the levitation mold would continue to absorb heat from the gob.

Especially radiation losses are compensated by the invention, which losses are produced by emitting heat from the gob to the molding material of the levitation mold. The molding material can be held at the temperature of the gob by a respective control of the heating device in accordance with the invention, which optionally also allows setting a temperature value which departs therefrom. Gobs and levitation molds can thus be cooled in a controlled and synchronous manner, i.e. with one and the same temperature-time curve. Temperature-induced inhomogeneities in the glass are thus completely avoided.

Several measures are considered for performing the invention. The molding material can be heated by applying an electric voltage for example. An especially interesting and efficient kind of heating of the molding material is inductive heating. Heat can be conducted into the molding material by a high-frequency induction coil.

Molding material for gas levitation are principally all such materials which are porous and sufficiently heat-resistant. Examples are: graphite, carbon, ceramic materials, metal. Especially suitable are porous ceramic materials on the basis of silicon carbide with adjustable electric conductivity.

The molding material must be open-pored, so that a gas flow can be placed through the pores. The flow emerges at the molding surfaces. It is not necessary that the entire levitation mold consist of open-pored material. It is sufficient when only such regions are porous which are adjacent to the molding surfaces and form the same.

The invention can be used for example to produce so-called gobs of glass. Such gobs are used as an intermediate product for optical items such as lenses. They are produced by dripping defined glass quantities from a glass melt. It is also possible to consider glass bodies which are produced as intermediate products which cool off in this process and are subsequently heated again in order to be subjected to a deformation process in a levitation mold. The term "preform" used here shall thus be understood in the widest possible sense.

BRIEF DESCRIPTION OF THE DRAWINGS

The invention is explained in closer detail by reference to the enclosed drawing, wherein the following is shown in detail:

FIG. 3 shows a schematic view (on a slightly enlarged scale as compared with FIG. 1) of a levitation mold with a gob of glass;

FIG. 4 shows a top view of the levitation mold according to FIG. 2.

DETAILED DESCRIPTION

Figure 1:
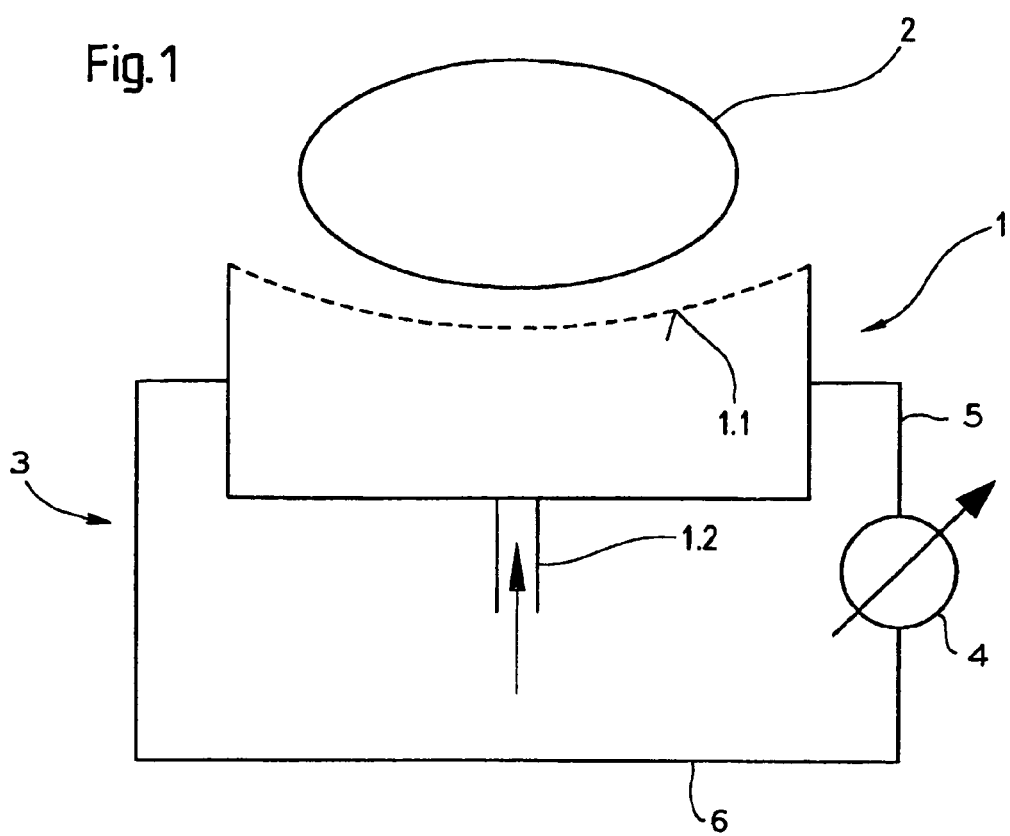
FIG. 1 shows a schematic view of a levitation mold with a gob of glass situated therein.

The levitation mold 1 as shown in FIG. 1 consists of an open-pored material, which in the present case is silicon carbide with adjustable electric conductivity.

A glass gob 2 is situated above the trough-like molding surface 1.1 of the shaping tool in the form of a levitation mold 1. The levitation mold 1 has a gas connection 1.2. If gas is introduced through the gas connection 1.2, It passes through the pores of the levitation mold 1, emerges at the molding surface 1.1 and makes the glass gob 2 levitate.

An electric circuit 3 is connected to the levitation mold, which causes the mold 1 itself to become the heating device. Circuit 3 comprises a variable power source 4 electrically connected to mold 1 by means of conductors 5 and 6. The levitation mold 1 can be heated by means of the same. The temperature achieved in the levitation mold can be adjusted by a respective setting of the current in the circuit 3.

Figure 2:
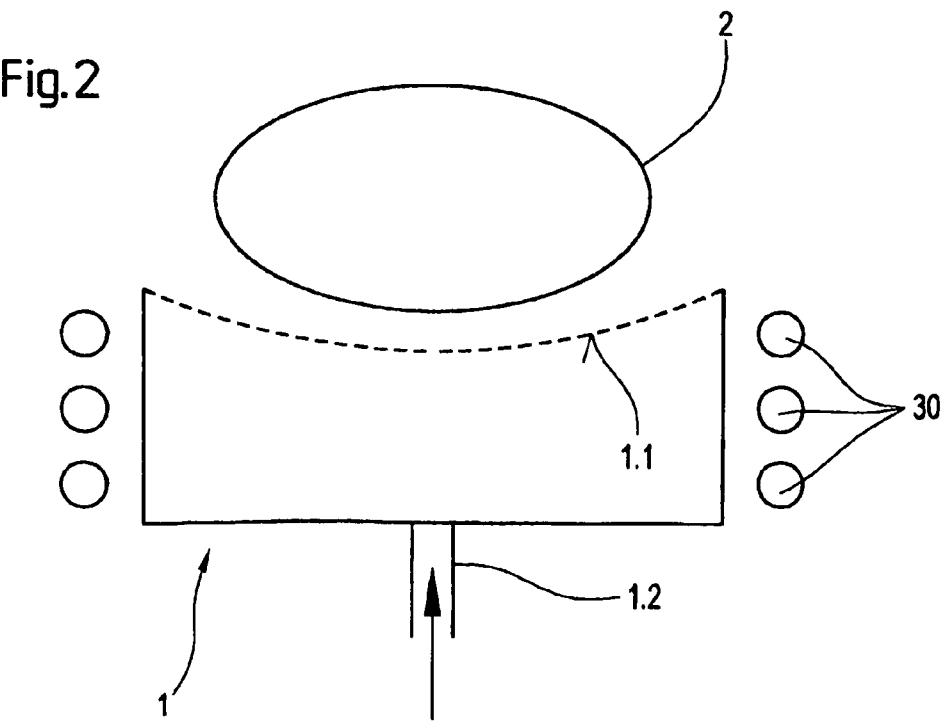
FIG. 2 shows another schematic view in analogy to FIG. 1 of a levitation mold with a gob of glass, but with a heating device of another kind.

The levitation mold 1 as shown in FIG. 2 consists of graphite. The remaining structure of the entire arrangement is analogous to the one of FIG. 1. There is a difference in the respect that the heating device comprises a high-frequency coil 30 by means of which heat can be induced directly in the molding material of the levitation mold 1.

The levitation mold 1 as shown in FIG. 3 is composed of a trough-like plate 1.3 with attached webs 1.4 and rests on a base 1.5. Gas connections 1.2 are provided here too, which connections open into the spaces between the webs.

The heating device 300 consists in the present case of a plurality of coiled heating filaments 300. They are embedded in the material of the trough-like plate 1.3. Several such coiled filaments (as seen in a top view) are arranged parallel adjacent to one another.

It would also be possible to provide an interlacing of such coiled filaments.

In all embodiments of levitation molds it is also possible to consider that the mold material is heated through its own resistance. The material can suitably be chosen with respect to the electric resistance inherent to said material.

An especially interesting embodiment is to arrange and configure the heating device in such a way that certain volume segments of the levitation mold can each be heated separately. Such a segmentation allows compensating possible differences in the absorption of heat from the preform to the levitation mold.

The invention claimed is:

1. A method for contactless shaping of gobs made of glass or glass ceramics by means of gas levitation, comprising the following method steps:
   a preform is produced;
   the preform is moved towards a shaping tool constructed of a mold material which is open-pored in its region facing the preform and is connected to a gas pressure source for producing a gas cushion between the shaping tool and the preform;
   the mold material itself constitutes a resistive element and the shaping tool mold material is directly heated electrically and non-inductively at least during a part of the shaping process via its own electric resistance by connection in an electric circuit having a power source and conductors connected to the shaping tool mold material while current within the circuit is caused to flow through the shaping tool mold material.

2. A method as claimed in claim 1, wherein the heating intensity and thus the temperature achievable in the shaping tool is controlled.

3. The method of claim 2, wherein said power source is a variable power source.

4. A method as claimed in claim 2, wherein the shaping tool mold material is sectioned with respect to its transmittable heating output, so that individual volume regions can be heated to a differently strong extent.

5. A method as claimed in claim 1, wherein the shaping tool mold material is sectioned with respect to its transmittable heating output, so that individual volume regions can be heated to a differently strong extent.

6. The method of claim 5, wherein said power source is a variable power source.

7. The method of claim 1, wherein said power source is a variable power source.

8. A method for contactless shaping of gobs made of glass or glass ceramics by means of gas levitation, comprising the following method steps:
   a preform is produced;
   the preform is moved towards a shaping tool constructed of a mold material which is open-pored in its region facing the preform and which is connected to a gas pressure source for producing a gas cushion between the shaping tool and the preform;
   the shaping tool mold material itself is directly heated electrically and non-inductively at least during a part of the shaping process by connecting the shaping tool mold material to an electric circuit, wherein the open-pored material itself is a heating resistor for the shaping tool and is heated through its own inherent electrical resistance.

9. A method as claimed in claim 8, wherein the heating intensity and thus the temperature achievable in the shaping tool is controlled.

10. A method as claimed in claim 9, wherein the shaping tool mold material is sectioned with respect to its transmittable heating output, so that individual volume regions can be heated to a differently strong extent.

11. A method as claimed in claim 8, wherein the shaping tool mold material is sectioned with respect to its transmittable heating output, so that individual volume regions can be heated to a differently strong extent.

* * * * *